(12) United States Patent
Lee et al.

(10) Patent No.: US 7,619,608 B2
(45) Date of Patent: Nov. 17, 2009

(54) ELECTROPHORETIC DISPLAY DEVICE

(75) Inventors: Yong-Uk Lee, Seongnam-si (KR); Bo-Sung Kim, Seoul (KR); Mun-Pyo Hong, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 615 days.

(21) Appl. No.: 10/829,294

(22) Filed: Apr. 22, 2004

(65) Prior Publication Data
US 2004/0263948 A1    Dec. 30, 2004

(30) Foreign Application Priority Data
Apr. 22, 2003   (KR)  ...................... 10-2003-0025561

(51) Int. Cl.
*G09G 3/34*    (2006.01)
(52) U.S. Cl. ........................ 345/107; 349/89
(58) Field of Classification Search ................ 345/107; 359/296, 252; 430/34, 35; 349/89, 144; 257/40; 313/495
See application file for complete search history.

(56) References Cited

U.S. PATENT DOCUMENTS

| | | | |
|---|---|---|---|
| 5,953,088 A * | 9/1999 | Hanazawa et al. .......... 349/110 |
| 6,017,584 A | 1/2000 | Albert et al. ............. 427/213.3 |
| 6,518,949 B2 * | 2/2003 | Drzaic .......................... 345/107 |
| 6,545,291 B1 * | 4/2003 | Amundson et al. ............ 257/40 |
| 6,563,260 B1 * | 5/2003 | Yamamoto et al. .......... 313/495 |
| 6,778,312 B2 * | 8/2004 | Kawai ......................... 359/266 |
| 6,816,146 B2 * | 11/2004 | Harada et al. ............... 345/107 |
| 6,885,495 B2 * | 4/2005 | Liang et al. ................. 359/296 |
| 7,030,412 B1 * | 4/2006 | Drzaic et al. .................. 257/59 |
| 7,075,603 B2 * | 7/2006 | Ihida et al. .................. 349/114 |
| 7,098,980 B2 * | 8/2006 | Hirota ........................ 349/141 |
| 7,148,867 B2 * | 12/2006 | Izumi .......................... 345/87 |
| 7,173,602 B2 * | 2/2007 | Hasegawa et al. ........... 345/107 |

FOREIGN PATENT DOCUMENTS

| | | |
|---|---|---|
| KR | 1019990066401 | 8/1999 |
| KR | 1020010001362 | 1/2001 |
| KR | 1020010066349 | 7/2001 |
| KR | 1020020093986 | 12/2002 |

\* cited by examiner

*Primary Examiner*—Abbas I Abdulselam
(74) *Attorney, Agent, or Firm*—Cantor Colburn LLP

(57) ABSTRACT

An electrophoretic display (EPD) shows a high contrast and a color display. The EPD blocks a channel of a thin film transistor from an incident light in order to prevent a current leakage. The color display may also include a white, black, red, green, blue, yellow, cyan, magenta or other color pigment in a micro-capsule.

20 Claims, 6 Drawing Sheets

ELECTROPHORETIC DISPLAY DEVICE

BACKGROUND OF THE INVENTION

This application claims the priority of Korean Patent Application No. 2003-0025561, filed on Apr. 22, 2003, in the Korean Intellectual Property Office, the disclosure of which is incorporated herein in its entirety by reference.

(a) Field of the Invention

The present invention relates to an electrophoretic display device.

(b) Description of the Related Art

An electrophoretic display device (EPD) is one of flat panel display devices that are used for electronic books. The EPD includes two panels including field-generating electrodes and a plurality of micro-capsules interposed between the panels. Each micro-capsule includes electric ink containing a plurality of white and black pigment particles that are negatively and positively charged respectively. Upon application of an electric field in the micro-capsules, the black and white particles move in opposite directions to display images.

The electrophoretic display is described in detail in the U.S. Pat. No. 6,017,584 entitled "Multi-color electrophoretic displays and materials for making the same", issued Jan. 25, 2000 and assigned to E-ink corporation, which is hereby incorporated by reference in its entirety.

The EPD has high reflectance and contrast regardless of viewing directions and thus it is comfortable for a viewer to see a screen of the EPD as if he sees a paper. Since the micro-capsule has bistability of black and white states, it maintains the shape without a constant supply of voltages across the micro-capsule, once set for black or white. Accordingly, the EPD requires less power consumption. In addition, the EPD does not require polarizers, alignment layers, liquid crystal, etc., that are expensive components for a liquid crystal display, which reduces the manufacturing costs.

However, since the conventional EPD does not have a black matrix for covering the areas that are not controlled by the field-generating electrodes, the light leaks between pixels and current due to the photocurrent generated by incident lights coming from outside.

SUMMARY OF THE INVENTION

The present invention provides a high quality EPD that shows reduced current leakage. In order to reduce the current leakage induced by the incident light on the semiconductor layer of the thin film transistor, the present invention provides varieties of ways blocking lights that may have reached the semiconductor layer of the thin film transistor. It may include adopting different structures of the thin film transistor or blocking the semiconductor layers with opaque layers such as Mo or Mo alloy. The present invention also provides a color EPD. The color EPD has red, green and blue micro-capsules. It may also have black, white, yellow, magenta or cyan micro-capsules.

BRIEF DESCRIPTION OF THE DRAWINGS

The present invention will become more apparent by describing embodiments thereof in detail with reference to the accompanying drawings.

DETAILED DESCRIPTION OF EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, EPDs and TFT array panels therefor according to embodiments of the present invention will be described with reference to the accompanying drawings.

An EPD according to an embodiment of the present invention will be described in detail with reference to FIGS. 1 and 2.

Figure 1:
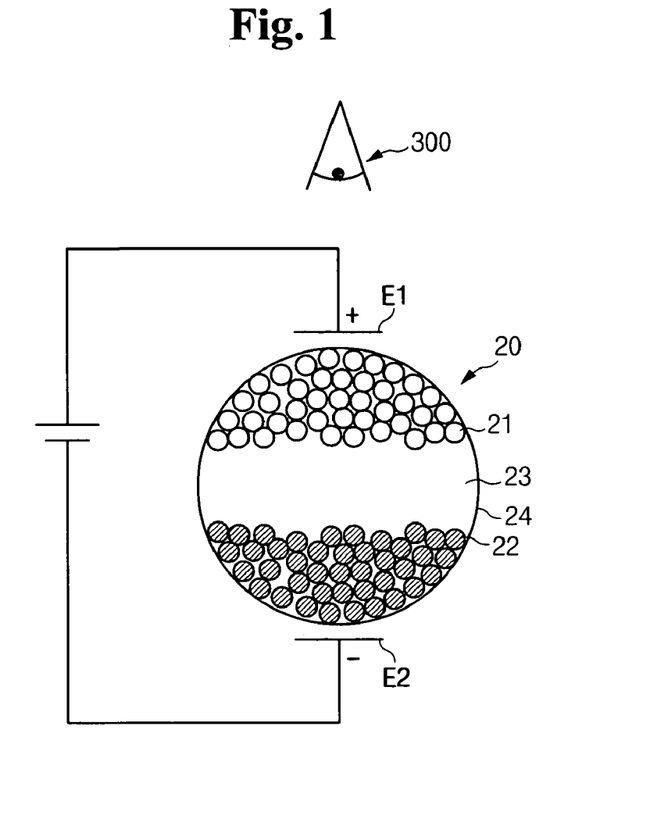
FIG. 1 is a schematic diagram of an EPD according to an embodiment of the present invention.
Figure 2:
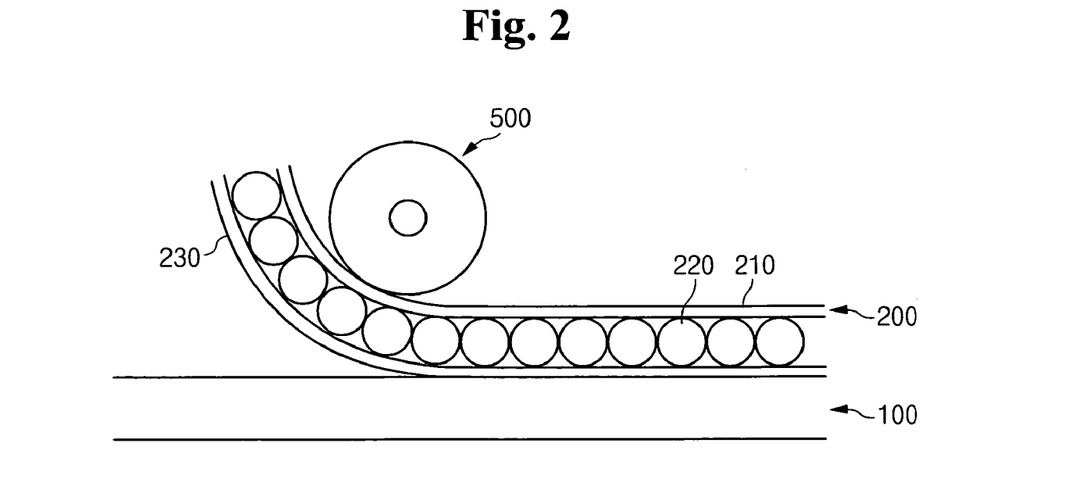
FIG. 2 illustrates a manufacturing method of the EPD shown in FIG. 1 according to an embodiment of the present invention.

FIG. 1 is a schematic diagram of an EPD according to an embodiment of the present invention and FIG. 2 illustrates a manufacturing method of the EPD shown in FIG. 1 according to an embodiment of the present invention.

Referring to FIG. 1, an EPD according to this embodiment includes a pair of field-generating electrodes E1 and E2 and a plurality of micro-capsules 20, each micro-capsule of the plurality of micro-capsules 20 having a surface 24, interposed between the electrodes E1 and E2.

Each micro-capsule 20 includes electric ink 23 containing a plurality of white and black pigment particles 21 and 22. One is negatively charged and the other is positively charged.

In order to display color image, the pigment particle 21 can be red, green, blue, cyan, yellow or magenta.

When voltage are applied to the electrodes E1 and E2, the white particle 21 and the black particle 22 move in opposite directions to color the surface of the micro-capsule and an observer 300 can see a black and white image.

Referring to FIG. 2, an array of pixel electrodes (not shown) as a kind of field-generating electrodes are formed on a panel 100 called a thin film transistor (TFT) array panel including a plurality of TFTs (not shown) connected to the pixel electrodes and a plurality of signal lines (not shown) connected to the TFTs. On the contrary, a common electrode (not shown), another field-generating electrode, is formed on another panel 200 called a common electrode panel including a flexible plastic film 210.

A plurality of micro-capsules 220 are dispersed into an adhesive 230. A front-plane lamination (FPL) including the adhesive 230 and the common electrode panel 200 is coated on a backplane, i.e., the TFT array panel 100 by using a laminator 500.

An EPD according to an embodiment of the present invention will be described in detail with reference to FIGS. 3 and 4.

Figure 3:
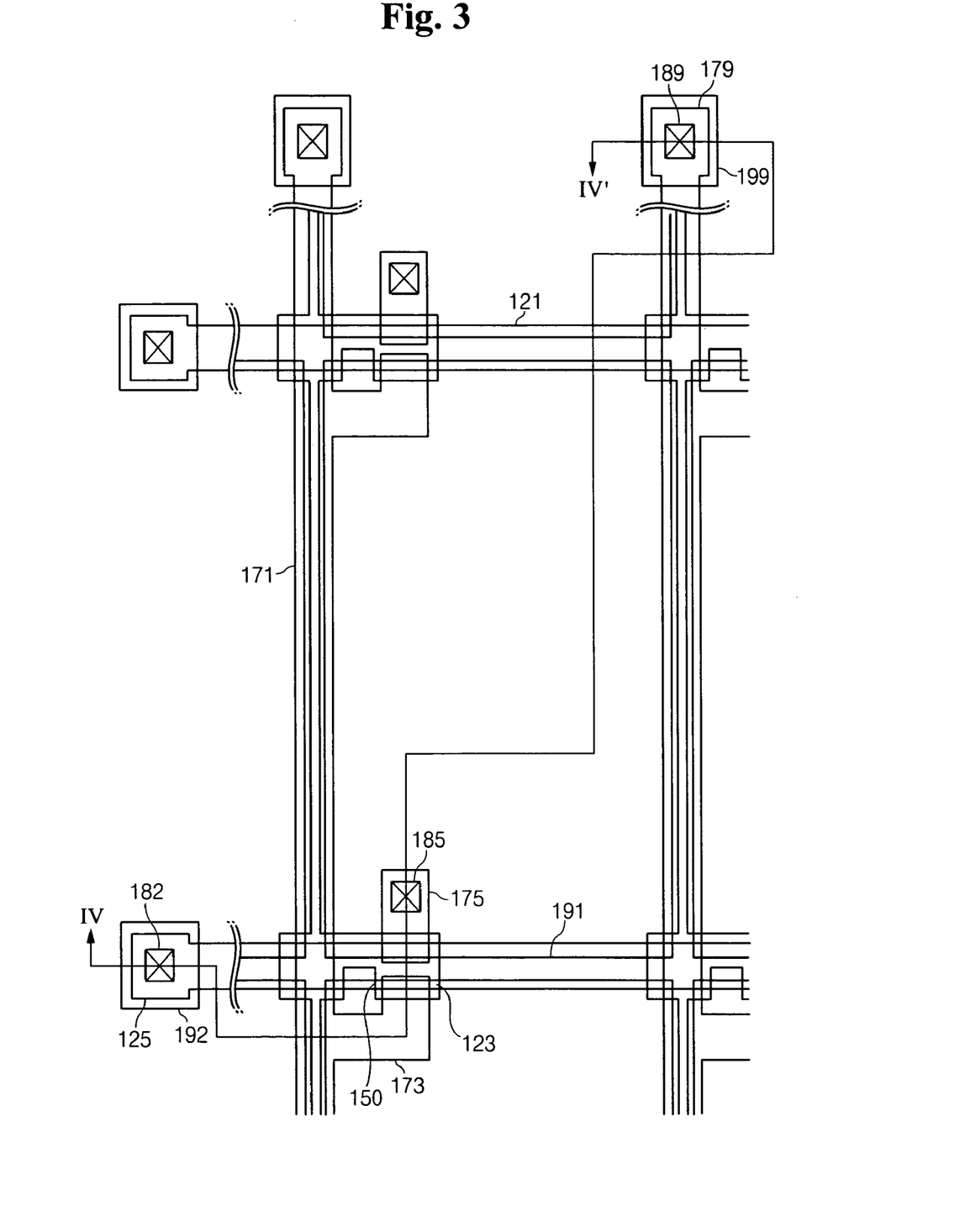
FIG. 3 is a layout view of an EPD according to an embodiment of the present invention.
Figure 4:
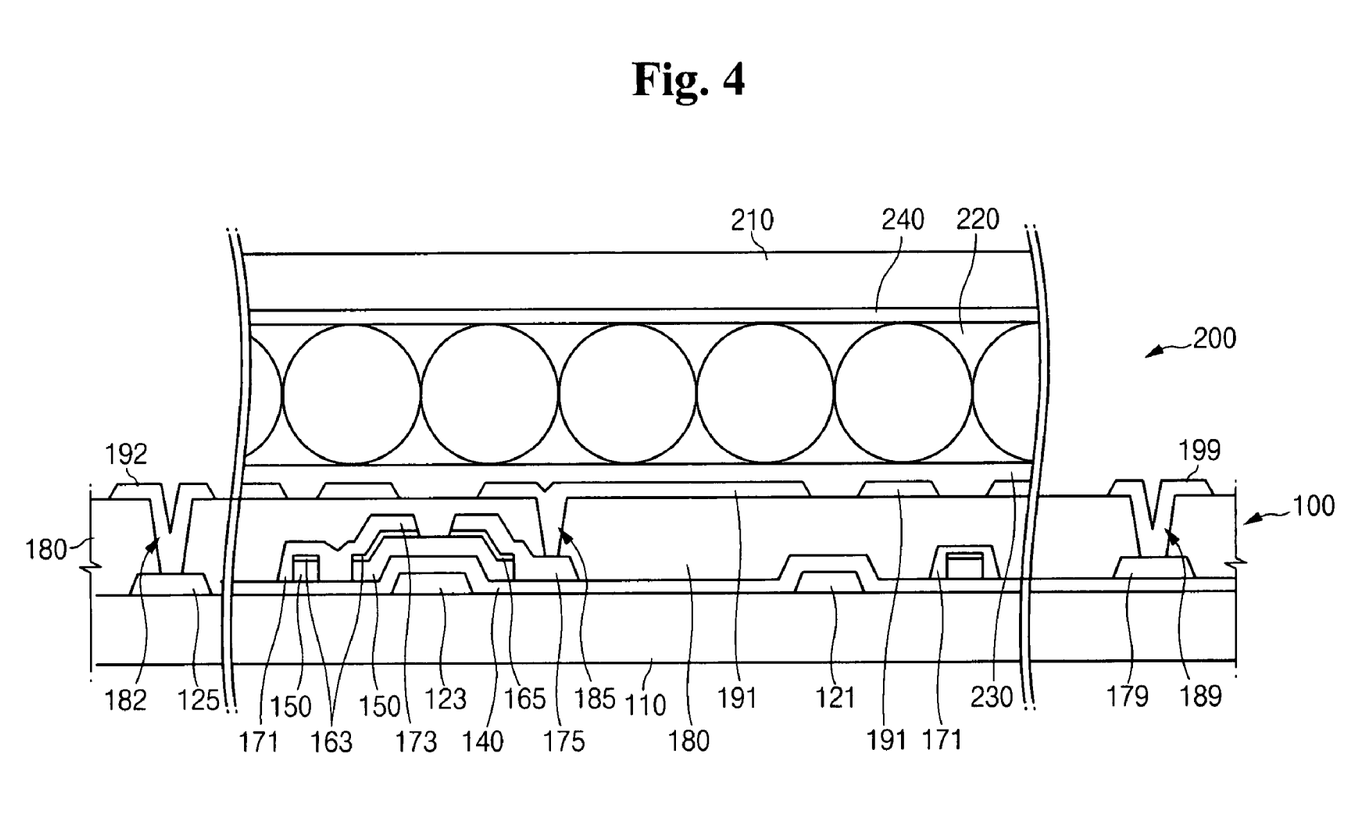
FIG. 4 is a sectional view of the EPD shown in FIG. 3 taken along the line IV-IV'.

FIG. 3 is a layout view of an EPD according to an embodiment of the present invention, and FIG. 4 is a sectional view of the EPD shown in FIG. 3 taken along the line IV-IV'.

An EPD according to this embodiment includes a TFT array panel 100, a common electrode panel 200, a plurality of capsules 220 interposed between the panels 100 and 200, and an adhesive 230 for combining the panels 100 and 200.

Concerning the common electrode panel 200, a common electrode 240 preferably made of transparent conductive material such as indium tin oxide (ITO) and indium zinc oxide (IZO) is formed on an insulating substrate 210 such as a flexible plastic film.

The TFT array panel 100 is now described in detail.

A plurality of gate lines 121 for transmitting gate signals are formed on an insulating substrate 110. Each gate line 121 extends substantially in a transverse direction and a plurality of portions of each gate line 121 form a plurality of gate electrodes 123. Each gate line 121 includes an end portion 125 having a larger area for contact with another layer or an external device.

The gate lines 121 are preferably made of Al and Al alloy, Ag and Ag alloy, Cu and Cu alloy, Cr, Mo, Mo alloy, Ta, or Ti. The gate lines 121 may have a multi-layered structure including at least two films having different physical characteristics, a lower film and an upper film. The upper film is preferably made of low resistivity metal such as Al containing metal, Ag containing metal, and Cu containing metal for reducing signal delay or voltage drop in the gate lines 121. On the other hand, the lower film is preferably made of material such as Cr, Mo, Mo alloy, Ta and Ti, which has good physical, chemical, and electrical contact characteristics with other materials such as ITO and IZO. A good exemplary combination of the lower film material and the upper film material is Cr and Al—Nd alloy.

The lateral sides of the gate lines 121 are inclined relative to a surface of the substrate 110, and the inclination angle thereof ranges about 20-80 degrees.

A gate insulating layer 140 preferably made of silicon nitride (SiNx) is formed on the gate lines 121.

A plurality of semiconductor stripes 150 preferably made of hydrogenated amorphous silicon (abbreviated to "a-Si") or polysilicon are formed on the gate insulating layer 140. Each semiconductor stripe 150 extends substantially in a longitudinal direction and has a plurality of projections branched out toward the gate electrodes 123. Each semiconductor stripe 150 becomes wider near the gate lines 121 to cover large areas of the gate lines 121.

An ohmic contact layer is preferably made of silicide or n+ hydrogenated a-Si heavily doped with n type impurity, and formed on the semiconductor stripes 150. The ohmic contact layer is removed at the channel area above the gate electrode 123. This divides the ohmic contact layer into 163 and 165, arranging 163 and 165 to face each other.

The lateral sides of the semiconductor stripes 150 and the ohmic contacts 163 and 165 are inclined relative to the surface of the substrate 110, and the inclination angle preferably ranges between about 20 degrees and about 80 degrees.

A plurality of data lines 171 and a plurality of drain electrodes 175 are formed on the ohmic contact layer 163 and 165 and the gate insulating layer 140.

The data lines 171 for transmitting data voltages extend substantially in the longitudinal direction and intersect the gate lines 121. A plurality of branches of each data line 171, which project toward the drain electrodes 175, form a plurality of source electrodes 173. The source electrode 173 and the drain electrode 175 are separated from and face each other with a gate electrode 123 therebetween. A gate electrode 123, a source electrode 173, and a drain electrode 175 along with a semiconductor layer 150 form a TFT having a channel formed between the source electrode 173 and the drain electrode 175.

The data lines 171 and the drain electrodes 175 include a film preferably made of refractory metal such as Mo, Mo alloy, Cr, Ta and Ti. They may further include an additional film located thereon and preferably made of Al containing metal. Each data line 171 includes an end portion 179 having a large area for contact with another layer or an external device.

Like the gate lines 121, the data lines 171 and the drain electrodes 175 have inclined lateral sides, and the inclination angle ranges between about 20 degrees and about 80 degrees.

The ohmic contact layers 163 and 165 are interposed only between the underlying semiconductor layer 150 and the overlying data line 171 that include the source electrode 173 and the drain electrode 175. The ohmic contact layer reduces the contact resistance between the metal layer and the semiconductor layer. The semiconductor layer 150 includes a plurality of exposed portions, which are not covered with the data lines 171 and the drain electrodes 175, such as portions located between the source electrodes 173 and the drain electrodes 175. Although the semiconductor layer 150 is narrower than the data line 171 at most places, it becomes wider near the gate lines as described above to smooth the surface profile, thereby preventing the disconnection of the data line 171.

A passivation layer 180 is formed on the data line 171 and the drain electrode 175, and the exposed portion of the semiconductor layer 150.

The passivation layer 180 is preferably made of acrylic organic material having a good planarization property and a low resistivity or low dielectric insulating material having dielectric constant lower than 4.0 such as a-Si:C:O and a-Si:O:F formed by plasma enhanced chemical vapor deposition (PECVD).

The passivation layer 180 has a plurality of contact holes 185 and 189 exposing the drain electrode 175, and the end portion 179 of the data line 171, respectively. The passivation layer 180 and the gate insulating layer 140 have a plurality of contact holes 182 exposing the end portions 125 of the gate lines 121. When the interlayer insulating layer is provided, the contact holes 182, 185 and 189 also penetrate the interlayer insulating layer.

Sidewalls of the contact holes 182, 185 and 189 are inclined relative to bottom surfaces of the contact holes 182, 185 and 189 and it is preferable that the inclination angle of the is contact holes 182, 185 and 189 ranges about 30 degrees and about 80 degrees.

An interlayer insulating layer (not shown) preferably made of silicon oxide and silicon nitride may be disposed under the passivation layer 180 to cover the exposed portion of the semiconductor layer 150.

A plurality of pixel electrodes 191 and a plurality of contact assistants 192 and 199, which are preferably made of reflective metal, are formed on the passivation layer 180. The pixel electrodes 191 are physically and electrically connected to the drain electrodes 175 through the contact holes 185 such that the pixel electrodes 191 receive the data voltages from the drain electrodes 175. The pixel electrodes 191 supplied with the data voltages generate electric fields in cooperation with the common electrode 240 on the common electrode panel 200.

FIG. 3 shows that the pixel electrodes 191 overlap the gate lines 121 and the data lines 171 to increase aperture ratio and to minimize the uncontrolled area. The above-described thick passivation layer 180 having low dielectric constant can reduce the parasitic capacitance between the pixel electrodes 191 and the gate lines 121 and the data lines 171.

The contact assistants 192 and 199 are connected to the exposed end portions 125 of the gate lines 121 and the exposed end portions 179 of the data lines 171 through the contact holes 182 and 189, respectively. The contact assistants 192 and 199 are not required but preferred to protect the exposed portions 125 and 179 and to complement adhesion between the exposed portions 125 and 179 and the external devices.

The pixel electrodes 191 and the contact assistants 192 and 199 may be made of transparent material such as ITO or IZO.

A plurality of metal pieces (not shown) made of the same layer as the gate lines 121 and the data lines 171 may be provided near the end portions 125 and 179 of the gate lines 121 and the data lines 171, respectively. The metal pieces are exposed though a plurality of contact holes in the passivation layer 180 and the gate insulating layer 140 and connected to the respective contact assistants 192 and 199.

According to another embodiment of the present invention, a light blocking layer (not shown) preferably made of insulating material containing black pigment is formed on the TFTs. The light blocking layer blocks light incident on the portions of the semiconductor layer 150 of the TFTs to prevent current leakage. The light blocking layer may be formed of the same layer as the passivation layer 180.

A TFT array panel for an EPD according to another embodiment of the present invention will be described in detail with reference to FIGS. 5 and 6.

Figure 5:
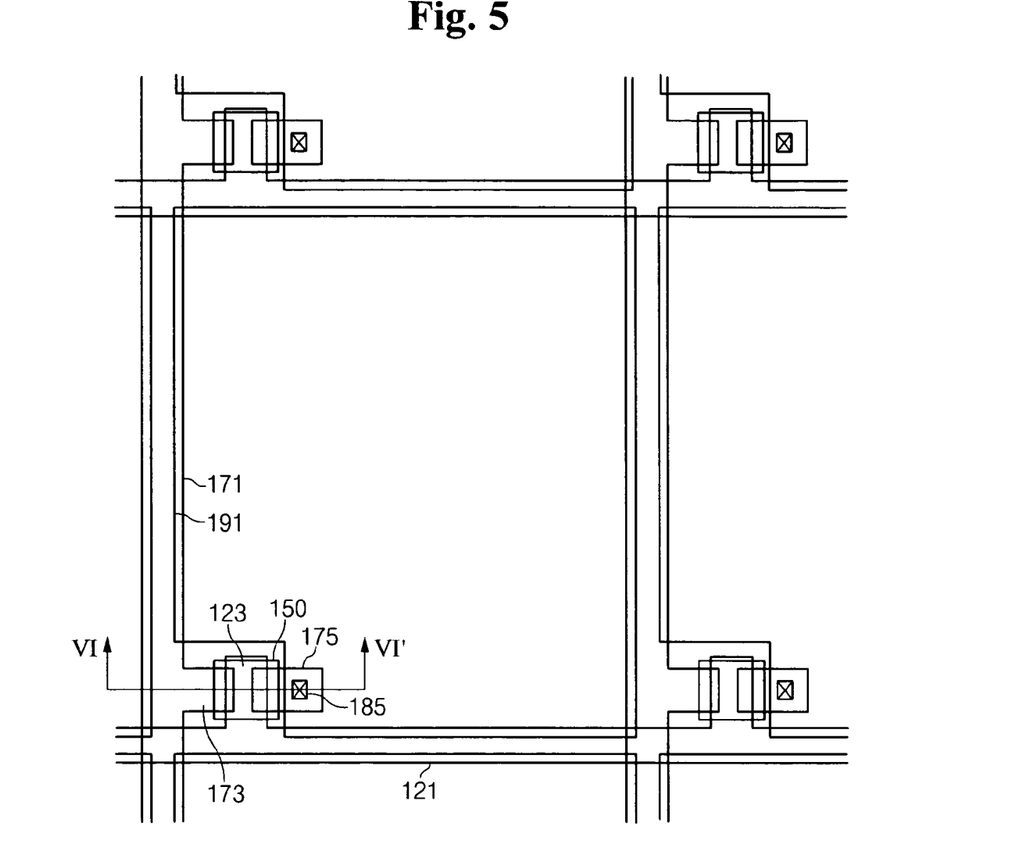
FIG. 5 is a layout view of a TFT array panel for an EPD according to an embodiment of the present invention.
Figure 6:
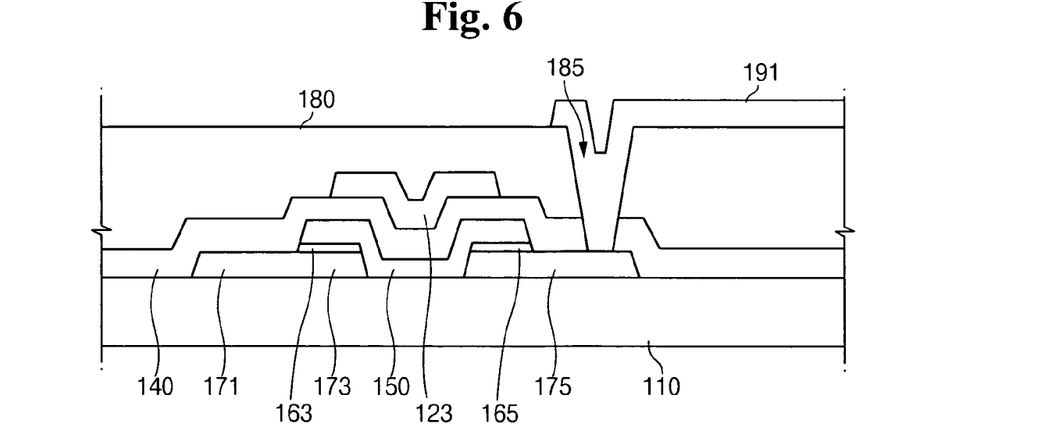
FIG. 6 is a sectional view of the TFT array panel shown in FIG. 5 taken along the line VI-VI'.

FIG. 5 is a layout view of a TFT array panel for an EPD according to an embodiment of the present invention, and FIG. 6 is a sectional view of the TFT array panel shown in FIG. 5 taken along the line VI-VI'.

A plurality of data lines 171 including a plurality of source electrodes 173 and a plurality of drain electrodes 175 are formed on a substrate 110, and a plurality of semiconductor islands 150 are formed thereon. A plurality of ohmic contact islands 163 and 165 are interposed between the data lines 171 and the drain electrodes 175 and the semiconductor islands 150.

A gate insulating layer 140 is formed on the semiconductor islands 150, the data lines 171, and the drain electrodes 175, and a plurality of gate lines 121 including a plurality of upwardly projecting gate electrodes 123 are formed on the gate insulating layer 140.

A TFT including a gate electrode 123, a semiconductor island 150, and source and drain electrodes 173 and 175 that are configured as described above is called a top gate type or staggered type TFT. Since the gate electrodes 123 are disposed on the semiconductor islands 150, the light incident on the semiconductor islands 150 from the top is blocked by the gate electrodes 123. On the other hand, the TFT shown in FIG. 4 is called a bottom gate type or inversely staggered type TFT and has a gate electrode that can block the light from the bottom.

A passivation layer 180 is formed on the gate lines 121 and the gate insulating layer 140. A plurality of contact holes 185 exposing the drain electrodes 175 are provided at the passivation layer 180 and the gate insulating layer 140, and a plurality of pixel electrodes 191 connected to the drain electrodes 175 through the contact holes 185 are formed on the passivation layer 180.

A TFT array panel for an EPD according to another embodiment of the present invention will be described in detail with reference to FIGS. 7 and 8.

Figure 7:
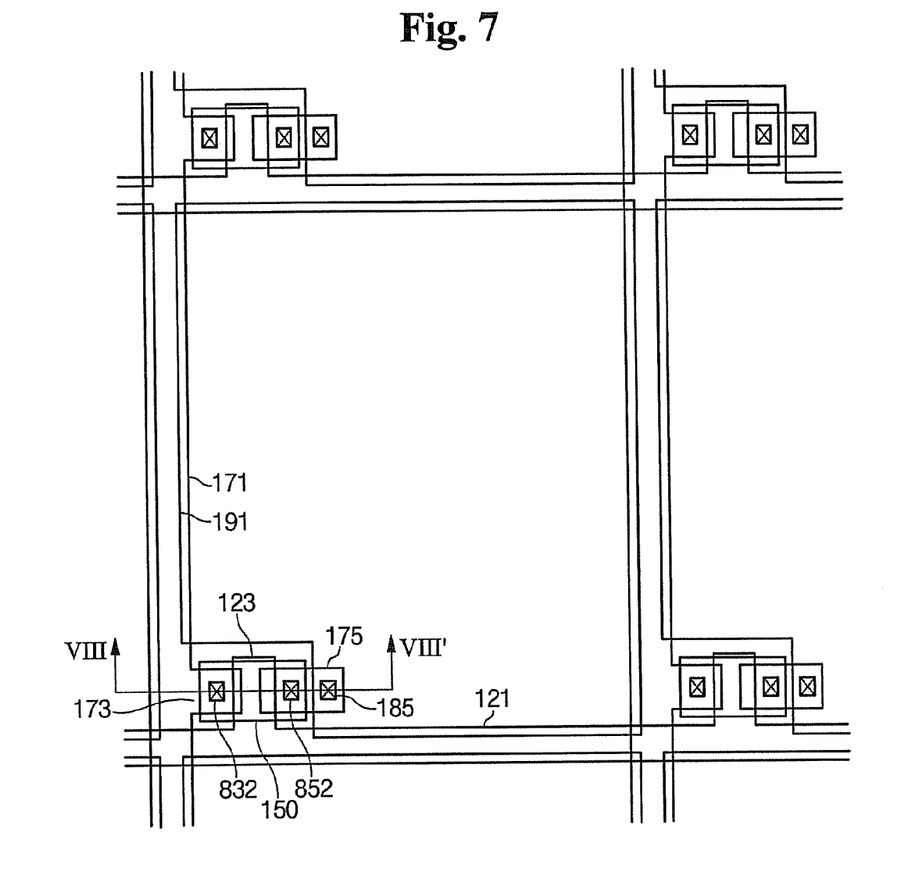
FIG. 7 is a layout view of a TFT array panel for an EPD according to an embodiment of the present invention.
Figure 8:
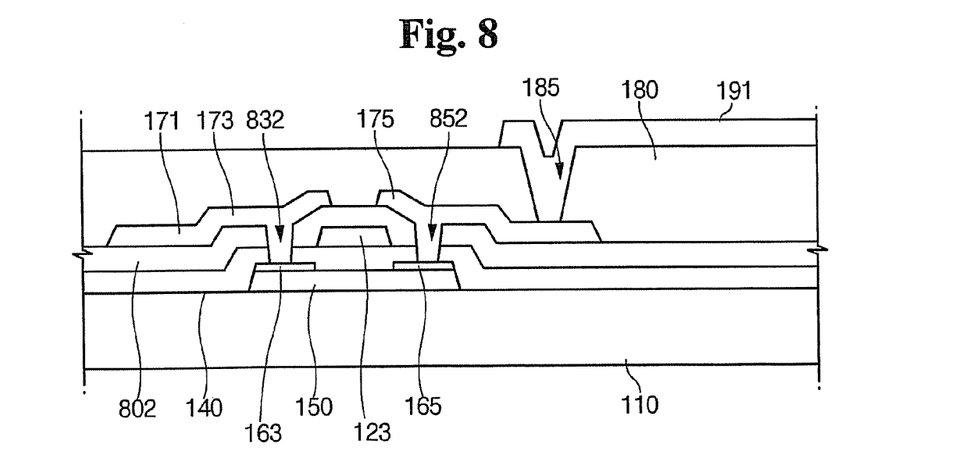
FIG. 8 is a sectional view of the TFT array panel shown in FIG. 7 taken along the line VIII-VIII'.

FIG. 7 is a layout view of a TFT array panel for an EPD according to an embodiment of the present invention, and FIG. 8 is a sectional view of the TFT array panel shown in FIG. 7 taken along the line VIII-VIII'.

A plurality of semiconductor islands 150 are formed on a substrate 110, and a plurality of ohmic contact islands 163 and 165 are formed on the semiconductor islands 150.

A gate insulating layer 140 is formed on the semiconductor islands 150 and the ohmic contacts 163 and 165, and a plurality of gate lines 121 including a plurality of upwardly projecting gate electrodes 123 are formed on the gate insulating layer 140.

An interlayer insulating layer 802 is formed on the gate lines 121 and the gate insulating layer 140 and the interlayer insulating layer 802 and the gate insulating layer 140 have a plurality of contact holes 832 and 852 exposing the ohmic contacts 163 and 165, respectively.

A plurality of data lines 171 including a plurality of source electrodes 173 and a plurality of drain electrodes 175 are formed on the interlayer insulating layer 140. The source and the drain electrodes 173 and 175 are connected to the ohmic contacts 163 and 165 through the contact holes 832 and 852.

A TFT including a gate electrode 123, a semiconductor island 150, and source and drain electrodes 173 and 175 that are configured as described above is called a planar type TFT. Similar to the TFT shown in FIGS. 5 and 6, the light incident on the semiconductor islands 150 from the top is blocked by the gate electrodes 123.

A passivation layer 180 with a plurality of contact holes 185 exposing the drain electrodes 175 is formed on the data lines 171 and the interlayer insulating layer 802. A plurality of pixel electrodes 191 are formed on the passivation layer 180 and connected to the drain electrodes 175 through the contact holes 185.

A TFT array panel for an EPD according to another embodiment of the present invention will be described in detail with reference to FIGS. 3 and 9.

Figure 9:
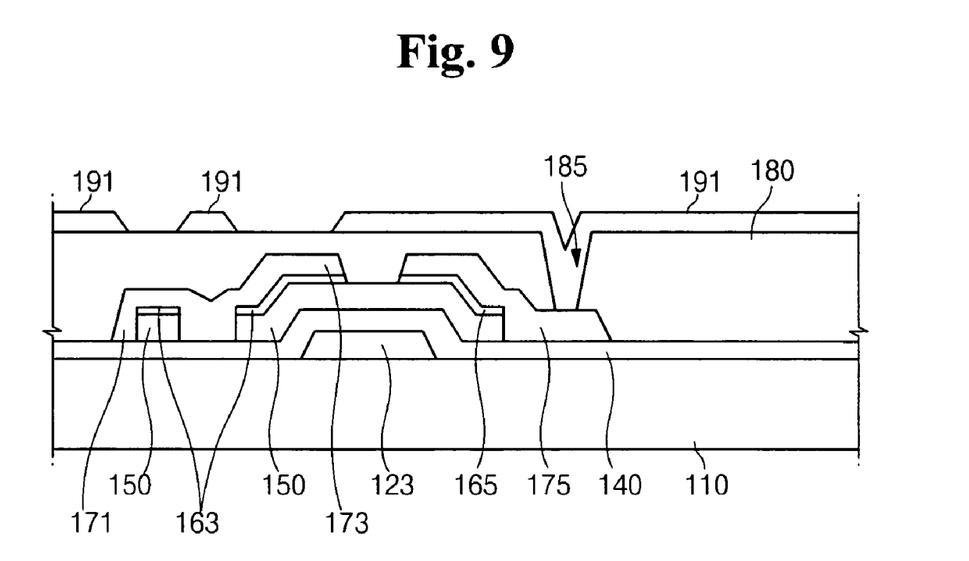
FIG. 9 is a sectional view of a TFT array panel according to another embodiment of the present invention.

FIG. 9 is a sectional view of a TFT array panel according to another embodiment of the present invention.

As shown in FIG. 9, a layered structure of the TFT array panel 100 according to this embodiment is almost the same as that shown in FIGS. 3 and 4. That is, a plurality of gate lines 121 including a plurality of gate electrodes 123 are formed on a substrate 110, and a gate insulating layer 140, a plurality of semiconductor stripes 150, and a plurality of ohmic contact stripes 163 and a plurality of ohmic contact islands 165 are sequentially formed thereon. A plurality of data lines 171 including a plurality of source electrodes 173 and a plurality of drain electrodes 175 are formed on the ohmic contacts 163 and 165, and a passivation layer 180 is formed thereon. A plurality of contact holes 185 are provided at the passivation layer 180 and the gate insulating layer 140, and a plurality of pixel electrodes 191 are formed on the passivation layer 180.

Unlike the TFT array panel shown in FIGS. 3 and 4, the pixel electrodes 191 of the TFT array panel according to this embodiment are made of opaque conductive metal having low reflectance such as Mo or Mo alloy. In addition, the pixel electrodes 191 extend to cover portions of the semiconductor stripes 150 disposed between the source electrodes 173 and the drain electrodes 175, thereby reducing the current leakage in the TFTs.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrophoretic display, comprising:
   a first gate line and a second gate line which extend in a first direction;
   a first data line and a second data line which extend in a second direction substantially perpendicular to the first direction;
   a first pixel electrode disposed in a first region restricted by the first gate, the second gate line, the first data line and the second data line;
   a plurality of micro-capsules; and
   a thin-film transistor comprising:
      a source electrode connected to the first data line;
      a gate electrode connected to the first gate line; and
      a drain electrode connected to the first pixel electrode,
   wherein
   entire lengths of opposing edges defining a first side and a second side of the first pixel electrode along the second direction between the first gate line and the second gate line overlap the first data line and the second data line, respectively, and
   the thin-film transistors is covered by the first pixel electrode at the drain electrode.

2. The electrophoretic display of claim 1, further comprising a second pixel electrode disposed in a second region adjacent to the first region, wherein
   the second pixel electrode comprises a first side and a second side opposite the first side, and
   one of the first data line and the second data line overlaps an entire length of an edge of the second pixel electrode defining one of the first side of the second pixel electrode and the second side of the second pixel electrode.

3. An electrophoretic display of claim 1, further comprising:
   an insulating layer interposed between one of the first data line and the second data line and the first pixel electrode, wherein the insulating layer has a dielectric constant lower than approximately 4.

4. The electrophoretic display of claim 3, wherein the insulating layer is made of one of a-Si:C:O or a-Si:O:F.

5. The electrophoretic display of claim 1, wherein one of the first data line and the second data line is made of a metal selected from a group consisting of Mo, Mo alloy, Cr, Ta and Ti.

6. The electrophoretic display of claim 1, wherein the plurality of micro-capsules comprises electric ink comprising a plurality of color pigment particles, a color of the plurality of color pigment particles is at least one of red, green, blue, cyan, yellow, magenta, black and white.

7. The electrophoretic display of claim 1, wherein entire lengths of opposing edges of the first pixel electrode defining a third side and a fourth side of the first pixel electrode along the first direction between the first data line and the second data line overlap the first gate line and the second gate line, respectively.

8. An electrophoretic display, comprising;
   a substrate;
   a first gate line and a second gate line which extend in a first direction;
   a first data line and a second data line which extend in a second direction substantially perpendicular to the first direction;
   a plurality of micro-capsules;
   a first thin film transistor comprising:
      a first channel;
      a first gate electrode;
      a first source electrode;
      a first drain electrode; and
      a first semiconductor layer;
   first opaque layer formed on the first semiconductor layer and disposed over the channel of the first thin film transistor;
   a second thin film transistor disposed adjacent to the first thin film transistor and comprising:
      a second channel;
      a second gate electrode;
      a second source electrode;
      a second drain electrode; and
      a second semiconductor layer;
   a second opaque layer formed on the second semiconductor layer and disposed over the channel of the second thin film transistor;
   a first pixel electrode disposed over only the first drain electrode of the first thin film transistor; and
   a second pixel electrode disposed over the second thin film transistor,
   wherein entire lengths of opposing edges defining a first side and a second side of the first pixel electrode along the second direction between the first gate line and the second gate line overlap the first data line and the second data line, respectively, and
   the first thin-film transistors is covered by the first pixel electrode at the drain electrode.

9. The electrophoretic display of claim 8, further comprising:
   an insulating layer formed between the one of the first data line and the second data line and one of the first pixel electrode and the second pixel electrode,
   wherein the insulating layer has a dielectric constant smaller than approximately 4.

10. The electrophoretic display of claim 8, wherein one of the first data line and the second data line is made of a metal selected from a group consisting of Mo, Mo alloy, Cr, Ta and Ti.

11. The electrophoretic display of claim 9, wherein the insulating layer is made of one of a-Si:C:O or a-Si:O:F.

12. The electrophoretic display of claim 8, wherein the plurality of micro-capsules comprises electric ink comprising a plurality of color pigment particles, a color of the plurality of color pigment particles is at least one of red, green, blue, cyan, yellow, magenta, black and white.

13. The electrophoretic display of claim 8, wherein entire lengths of opposing edges of the first pixel electrode defining a third side and a fourth side of the first pixel electrode along the first direction between the first data line and the second data line overlap the first gate line and the second gate line, respectively.

14. An electrophoretic display, comprising;
   a substrate;
   a thin film transistor formed on a surface of the substrate, the thin film transistor comprising:
      a source electrode and a drain electrode formed on the substrate;
      a semiconductor layer formed on the source electrode and the drain electrode;
      an insulation layer formed on the insulation layer; and a gate electrode formed on the insulation layer;

a first gate line and a second gate line which extend in a first direction;

a first data line and a second data line which extend in a second direction substantially perpendicular to the first direction;

a plurality of micro-capsules;

a first pixel electrode disposed in a first region restricted by the first gate line, the second gate line, the first data line and the second data line; and a second pixel electrode disposed in a second region adjacent to the first region, wherein entire lengths of opposing edges defining a first side and a second side of the first pixel electrode along the second direction between the first gate line and the second gate line overlap the first data line and the second data line, and the thin film transistor is covered by the first pixel electrode at the drain electrode.

15. The electrophoretic display of claim 14, further comprising:

an insulating layer formed between one of the first data line and the second data line and one of the first pixel electrode and the second pixel electrode, wherein the insulating layer has a dielectric constant smaller than approximately 4.

16. The electrophoretic display of claim 15, wherein the insulating layer is made of one of a-Si:C:O or a-Si:O:F.

17. The electrophoretic display of claim 14, wherein one of the first data line and the second data line is made of a metal selected from a group consisting of Mo, Mo alloy, Cr, Ta and Ti.

18. The electrophoretic display of claim 14, wherein an inclination angle of one of the first gate line, the second date line, the first data line and the second data line relative to a surface of the substrate ranges from between approximately 20 degrees to approximately 80 degrees.

19. The electrophoretic display of claim 14, wherein entire lengths of opposing edges of the first pixel electrode defining a third side and a fourth side of the first pixel electrode along the first direction between the first data line and the second data line overlap the first gate line and the second gate line, respectively.

20. The electrophoretic display of claim 14, wherein the plurality of micro-capsules comprises electric ink comprising a plurality of color pigment particles, a color of the plurality of color pigment particles is at least one of red, green, blue, cyan, yellow, magenta, black and white.

* * * * *